United States Patent [19]

Handa et al.

[11] Patent Number: 4,684,430
[45] Date of Patent: Aug. 4, 1987

[54] APPARATUS FOR FUSIBLY INTERCONNECTING THERMOPLASTIC PIPES

[75] Inventors: Takayuki Handa; Yasushi Takeuchi; Masumi Kato; Hisazi Seki, all of Tokyo, Japan

[73] Assignee: Mitsui Petrochemical Industries, Tokyo, Japan

[21] Appl. No.: 508,403

[22] Filed: Jun. 28, 1983

[30] Foreign Application Priority Data

Jun. 29, 1982 [JP] Japan .................................. 57-110673

[51] Int. Cl.⁴ ....................... B29C 27/06; G05G 5/02
[52] U.S. Cl. .................................... 156/366; 156/368; 156/378; 156/391; 156/379.6; 156/499; 156/503; 228/44.5; 228/56.5; 269/224
[58] Field of Search ................... 228/9, 44.5, 56.5; 156/378, 358, 368, 366, 503, 499, 391, 379.6, 367; 269/23, 26, 224

[56] References Cited

U.S. PATENT DOCUMENTS

| | | | |
|---|---|---|---|
| 2,772,588 | 12/1956 | Jones | 269/224 |
| 2,867,003 | 1/1959 | Stiles | 269/224 |
| 3,002,871 | 10/1961 | Tramm | 156/73.2 |
| 3,013,925 | 12/1961 | Larsen | 156/499 |
| 3,049,465 | 8/1962 | Wilkins | 156/379.6 |
| 3,238,867 | 3/1966 | Tureit | 269/224 |
| 3,970,985 | 7/1976 | Sage | 338/202 |
| 4,008,118 | 2/1977 | Wesebaum et al. | 156/499 |
| 4,132,578 | 1/1979 | Gell, Jr. | 156/294 |
| 4,334,146 | 6/1982 | Sturm | 156/379.7 |
| 4,352,708 | 10/1982 | McElroy | 156/499 |
| 4,416,713 | 11/1983 | Brooks | 156/367 |

FOREIGN PATENT DOCUMENTS

| | | |
|---|---|---|
| 56-27911 | 3/1981 | Japan . |
| 56-40518 | 4/1981 | Japan . |
| 56-113813 | 9/1981 | Japan . |

Primary Examiner—Donald E. Czaja
Assistant Examiner—Merrell C. Cashion, Jr.
Attorney, Agent, or Firm—Beveridge, DeGrandi and Weilacher

[57] ABSTRACT

Thermoplastic pipes held by a pair of clamp mechanisms are fusibly interconnected. A torque wrench moves one clamp mechanism toward the other clamp mechanism and provides a signal when the force applied is a given value. A locking mechanism is operated in response to this signal to lock the torque wrench in position. The apparatus is programmed to release the locking mechanism at the end of a predetermined time period. Changes in the programmed conditions are effected in response to changes in the size of one of the clamp mechanisms.

10 Claims, 11 Drawing Figures

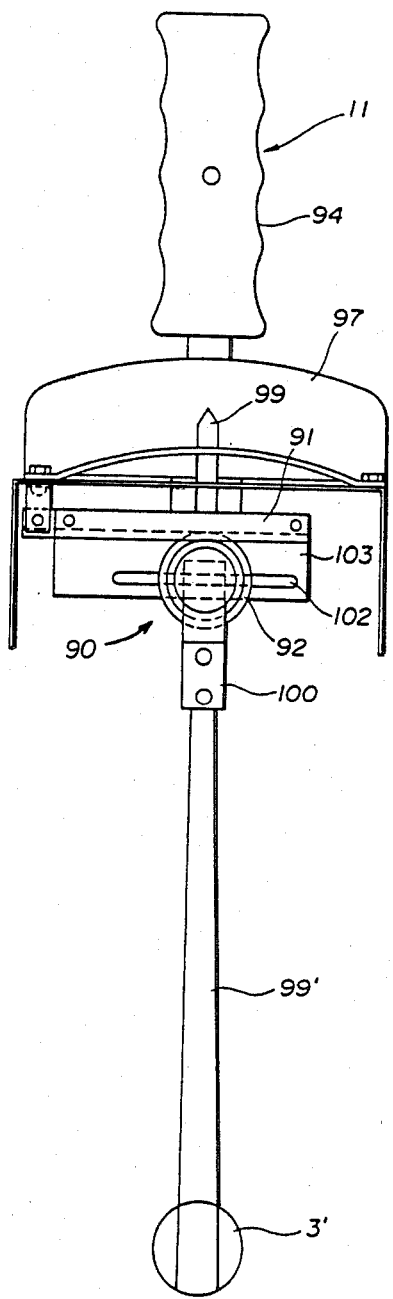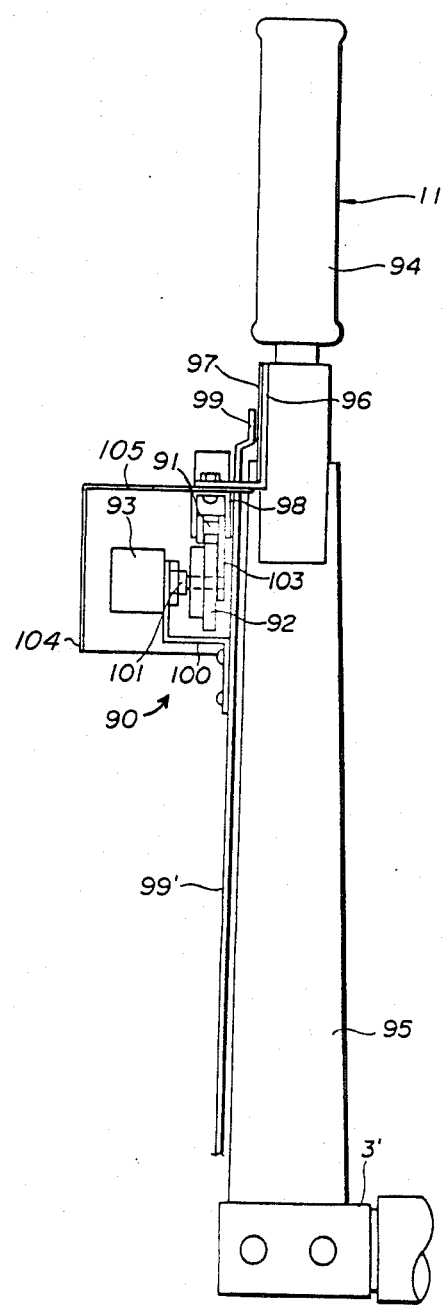

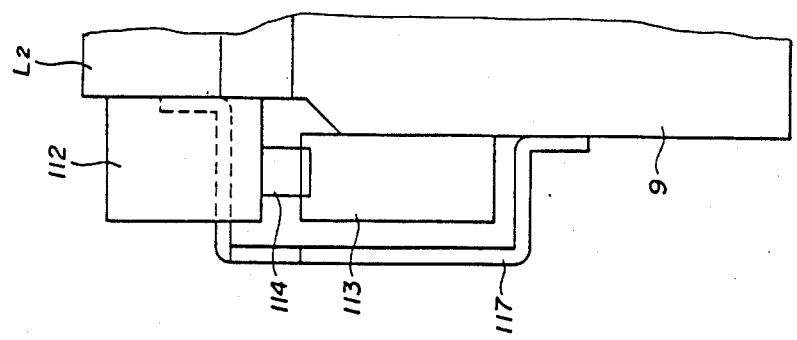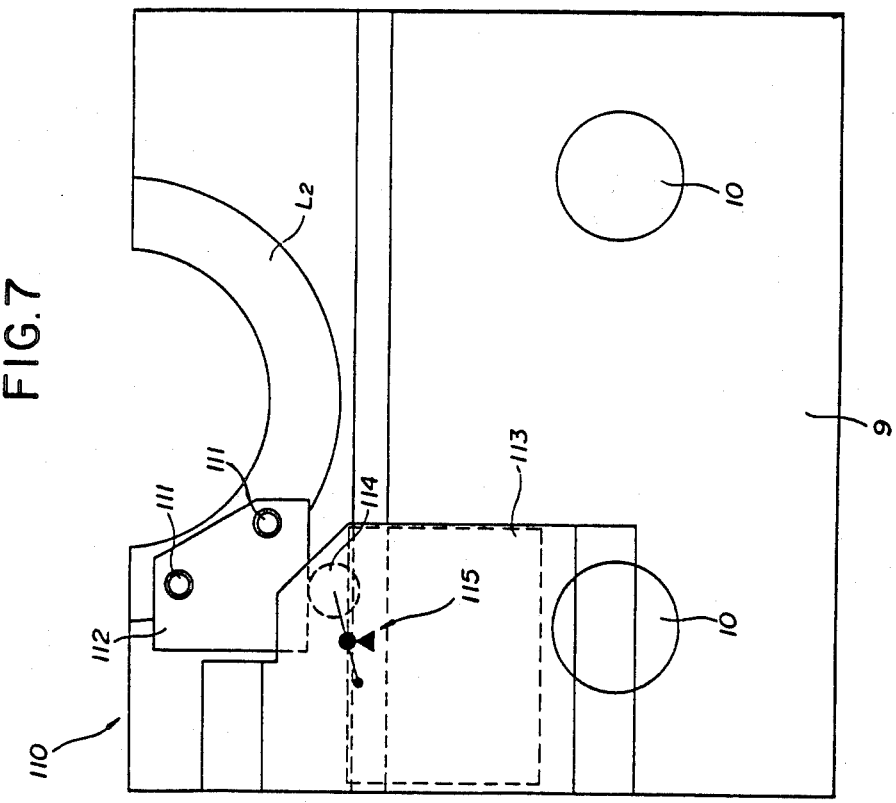

APPARATUS FOR FUSIBLY INTERCONNECTING THERMOPLASTIC PIPES

BACKGROUND OF THE INVENTION

The present invention relates to apparatus for fusibly interconnecting pipes.

Metal pipes have long been used for distribution of town gas, but intermediate density polyethylene pipes are now widely used for the same purpose because they provide moderate rigidity and flexibility and because, due to their noncorrosive nature, they can be used semi-permanently.

Such polyethylene pipes are presently connected together by a fusion connection technique. This technique includes the steps of chamfering the fusible connecting surfaces, heating and fusing such surfaces with a heater, applying a specified pressure for a specified time period, and waiting for the pipes and the fused connection to cool. A variety of devices for performing this have been developed and proposed. However, these fusing connectors have various disadvantages. For example, a fusing connector proposed in Japanese patent application No. 40518/1981 is capable of holding a predetermined pressurizing force for a required period without any manpower. This and other fusing connectors all have a disadvantage that they require skill for correct operation. Namely, in the fusing connection processes, different times are often required for the steps of pressurizing and fusing, heating and holding, pressurized connecting, and cooling. The times also vary in accordance with the size of pipes being connected. An operator should remember such process times, but he may forget such data if he has not worked with the fusing connector for a while. Moreover, operators of existing fusing connectors must have and observe a timer or clock like a stopwatch in order to watch the processing time. At the conclusion of each phase of the process, the operator must reset the second hand to zero, restart the time, and continue to observe the time. In addition, there has been a problem when the next process step has been started due to confusion in the time observations for the respective processings.

An object of this invention is to provide an effective fusing connector for semi-automatically connecting thermoplastic resin pipes.

SUMMARY OF THE INVENTION

According to the present invention, the pipe fusing apparatus is provided with a pair of clamp mechanisms for holding two pipes, one of these mechanisms being supported for movement in an axial direction to permit the movement of one pipe toward the other pipe. A manually operated lever, preferably a torque wrench, is operatively connected to one of the clamp mechanisms for moving it toward the other clamp mechanism. Means are provided to give a signal when the force applied is a given value. A locking means is operable in response to this signal to lock the lever in position, and to unlock the lever at the end of a predetermined time period.

Preferably, the torque wrench is provided with a movable needle, and the force-indicating signal is an electrical signal provided in response to movement of the needle to a given position. The signal providing means may comprise a rack on one portion of the torque wrench and a pinion on another portion of the torque wrench. The pinion is connected to a variable resistor which provides the electrical signal. Also, it is preferred to provide the apparatus with means for selecting and changing the operating program of the apparatus, i.e. changing the predetermined time periods and possibly the forces, in response to changes in the size of one of the clamp mechanisms. The apparatus also preferably has buffering means for absorbing the impact or vibration which occurs when the torque wrench and clamp mechanism are unlocked, and a compensating means which is operable when the torque wrench is locked for maintaining a force on the movable clamp mechanism when there is relative movement between the clamp mechanisms.

The invention may be performed by apparatus which takes many forms and embodiments, examples of which are described below by way of illustration rather than limitation.

BRIEF DESCRIPTION OF THE DRAWINGS

The attached drawings disclose a preferred embodiment of a fusing connector apparatus which utilizes the principles of the invention.

FIG. 3 is an enlarged front view of an electric signal generating mechanism used in the apparatus.

FIG. 4 is an enlarged side view of the signal generating mechanism.

FIG. 7 is a front view of an embodiment of the size selecting mechanism.

FIG. 8 is a side view of the size selecting mechanism.

DETAILED DESCRIPTION OF THE INVENTION

The fusing connector of the present invention is described by way of the first embodiment thereof with reference to the attached drawings.

Figure 1:
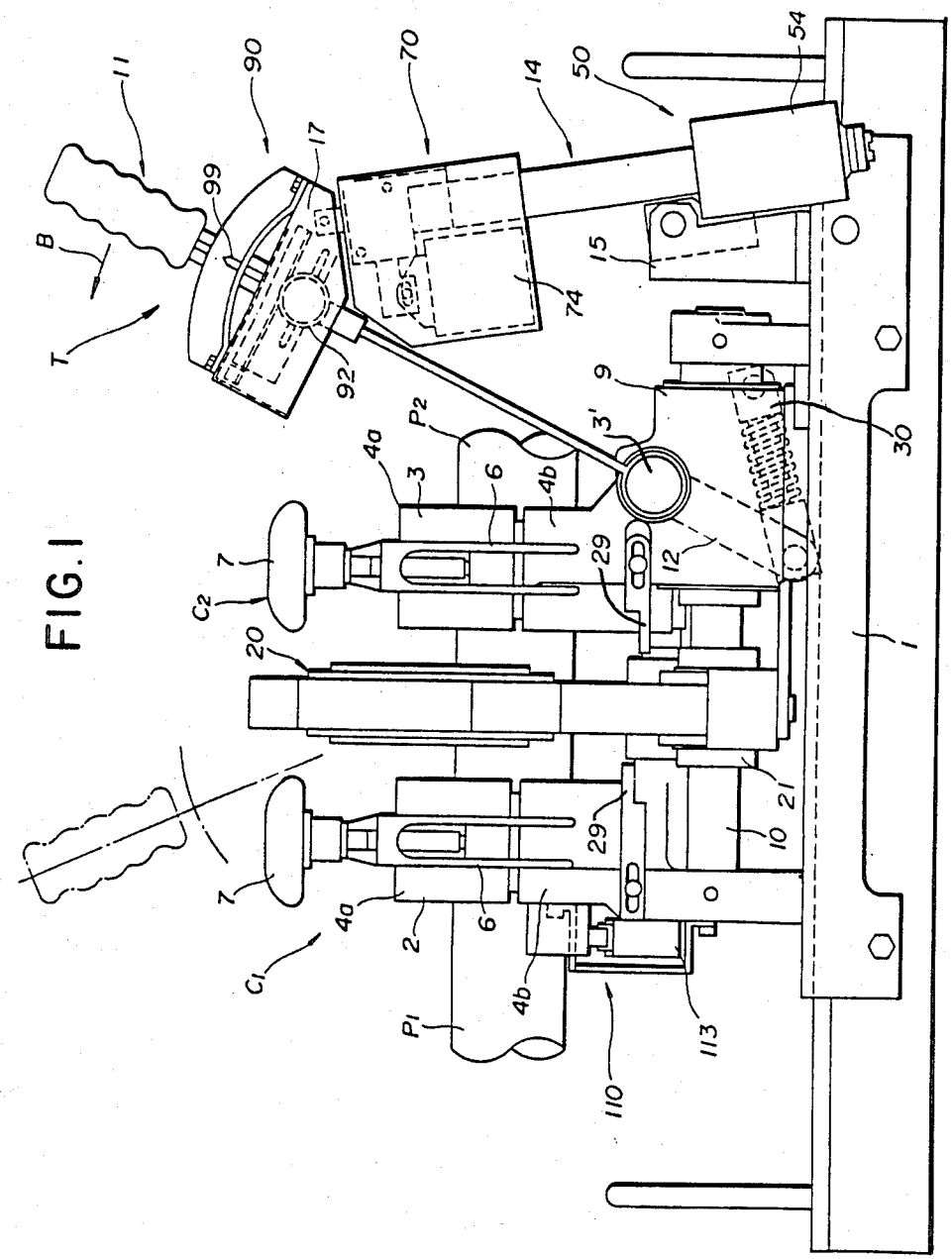
FIG. 1 is a front view of the apparatus.
Figure 2:
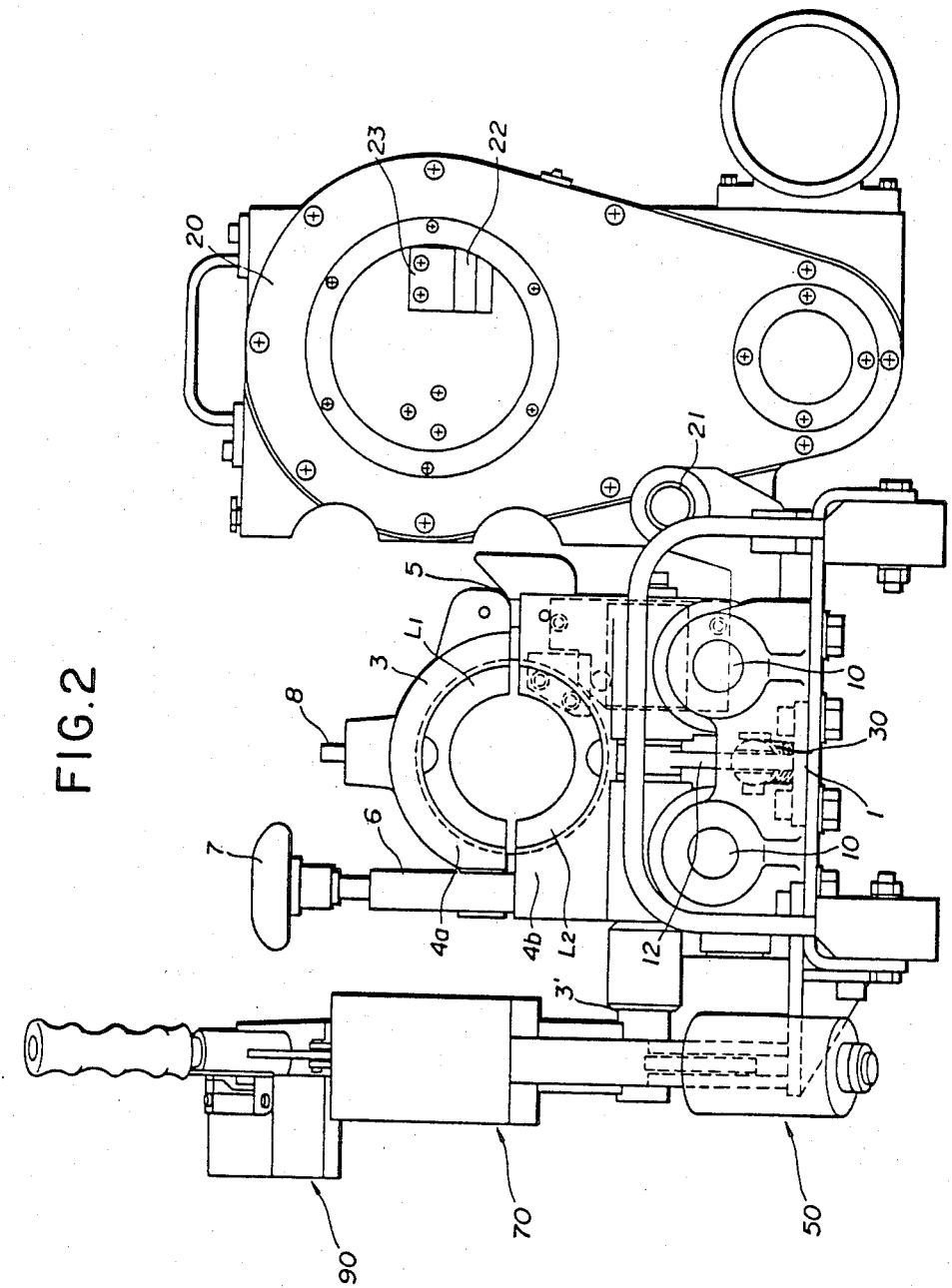
FIG. 2 is a side view of the same.

As seen in FIG. 1 and FIG. 2, the fusing connector of the present invention is provided with a pair of clamp mechanisms $C_1$ and $C_2$ for holding the pipes $P_1$ and $P_2$ which are to be connected. A clamp 2 is provided for holding the end of one pipe, and a clamp 3 is provided for holding the end of the other pipe to be connected. The clamps 2 and 3 are each formed of the split rings $4a$ and $4b$ as shown in FIG. 2. One of the split rings $4b$ is fixed and the other ring $4a$ is pivotally supported by the link 5. These split rings $4a$ and $4b$ are provided with semicircular liners $L_1$ and $L_2$. As shown in FIG. 2, when the split rings $4a$ and $4b$ are tightened, the liners Land $L_2$ have the same inner diameter as the end of pipes being held. The end of pipes can be held forcibly within the liners $L_1$, $L_2$ by screwing external threads connected to the handle 7 into the internal threads of the member 6. At this time, the end of the pipe is reformed. The reference number 8 designates a member for supporting a heater of the type used for heating plastic pipes.

One clamp 2 is immovable and the other clamp 3 is slidably supported on shafts 10 by a bearing assembly 9. A torque wrench 11 is operable as a manually operable lever which moves the clamp 3 forcibly toward the stationary clamp 2. The lower end of torque wrench 11 is coupled by a shaft 3' to the link 12 which is pivotally secured to the base 1 by a compensating mechanism 30. Shaft 3' is supported by the movable clamp assembly $C_2$ so that a force applied to the torque wrench 11 slides the clamp 3 toward the clamp 2 along the shafts 10. The torque wrench 11 usually provides a pressurizing force of 1 to 900 kg.cm.

The apparatus is provided with a torque wrench holder 14 which is pivotally connected to a bracket 15 of the base 1 by a buffer mechanism 50. The upper part of the torque wrench holder has a lock mechanism 70 which engages a bracket 17 on the torque wrench.

To chamfer the ends of the plastic pipes $P_1$ and $P_2$, the apparatus has a cutter case 20 which is slidably movable parallel to shafts 10 and is pivotally supported on a bearing 21. This cutter case 20 is provided with an external motor for driving a rotating cutter 22 with a chamfering blade 23. Therefore, when the rotating cutter 22 is pivoted on bearing 21 to a position where it is inserted between the clamps 2 and 3, the clamped pipes are chamfered so that their end surfaces are accurately perpendicular to the shaft 10.

Moreover, the fixed split ring 4b is provided with clamp stoppers 29 which are adjustable so that the minimum distances between the cutter case 20 and clamps 2 and 3 can be limited during the chamfering operation.

The structure described above is substantially the same as the structure described in Japanese patent publication No. 40518/1981 which has been laid open to public inspection and is incorporated herein by reference.

FIGS. 3 and 4 show an electric signal generating mechanism 90 associated with the torque wrench 11. This mechanism is operable to generate a signal when the torque applied by the torque wrench 11 reaches a certain pressurized value. In the embodiment shown in FIGS. 3 and 4, this signal generating mechanism 90 is composed of a rack 91 which swings together with the torque wrench 11, a pinion 92 which is rotated by said rack, and a potentiometer or variable resistor 93 which is connected to and actuated by the pinion. The torque wrench consists of a handle 94 and plate spring body 95. The lower end of the plate spring body is secured to the shaft 3' which is mounted on the clamp 3. Fixed at the intermediate portion of the torque wrench is an L-shaped member 96 (FIG. 4), to which a scale plate 97 and rack fitting member 98 are mounted.

An indicating needle 99 is provided in such a manner that it swings together with the body 95 when no torque is applied to the torque wrench 11. The main part 99' of the indicating needle carries a bracket 100 which supports the variable resistor 93. The shaft 101 of the variable resistor carries the pinion 92; and, the end portion of shaft 101 is guided by a slit 102 in a guide plate 103.

Since relative motion occurs between the indicating needle 99 and the variable resistor 93 during normal use of the torque wrench 11, the hood 105 of protection cover 104 and the L-shaped portion 96 are formed with grooves which permit swinging movement of the indicating needle 99 to the right and left.

Figure 5:
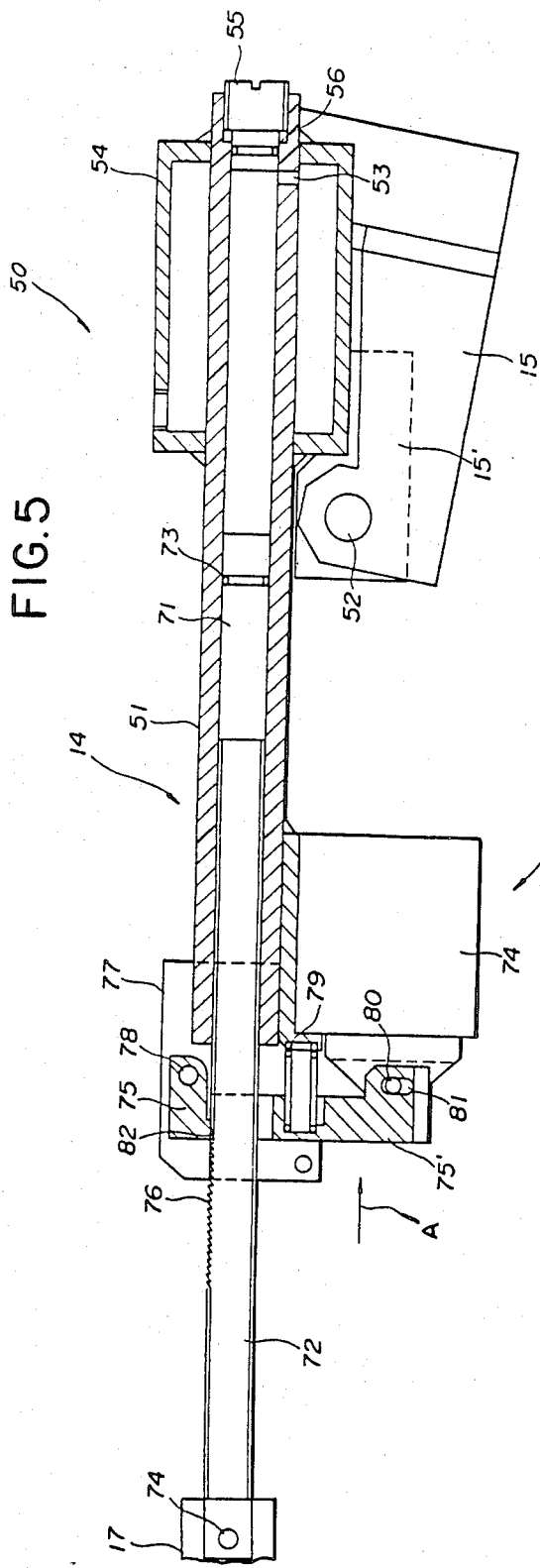
FIG. 5 is an enlarged front view of a lock mechanism and buffer mechanism.

As previously mentioned, the torque wrench holder 14 is provided with a lock mechanism 70. As shown in FIG. 5, the torque wrench holder 14 has a hydraulic cylinder 51, a piston 71 provided with an O-ring 73, and a rod 72 which slides with respect to the cylinder. The top end of rod 72 is pivotally secured to the bracket 17 on torque wrench 11, while the lower end of cylinder 51 is pivotally connected by a pin 52 to the bracket 15 of the base 1 through a fitting bracket 15'. As shown in FIG. 5, the lock mechanism 70 consists of a solenoid 74 fixed to the side of hydraulic cylinder 51, and a pawl 75 for engaging projections 76 formed in the circumference of the rod 72. The pawl 75 is pivotally supported on member 77 by a pin 78. When electric power is not being supplied to the solenoid 74, a spring 79 holds the tooth 82 of the pawl out of engagement with the projections 76 on rod 72. But when electric power is supplied to energize the solenoid 74, a pin 80 on the solenoid, located in an elongated hole 81 of an arm 75' of the pawl 75, pulls the arm 75' in the direction indicated by the arrow A against the spring 79. This moves the pawl tooth 82 into engagement with the projection 76, thereby locking the rod 72 at a fixed axial position relative to the hydraulic cylinder 51.

Figure 9:
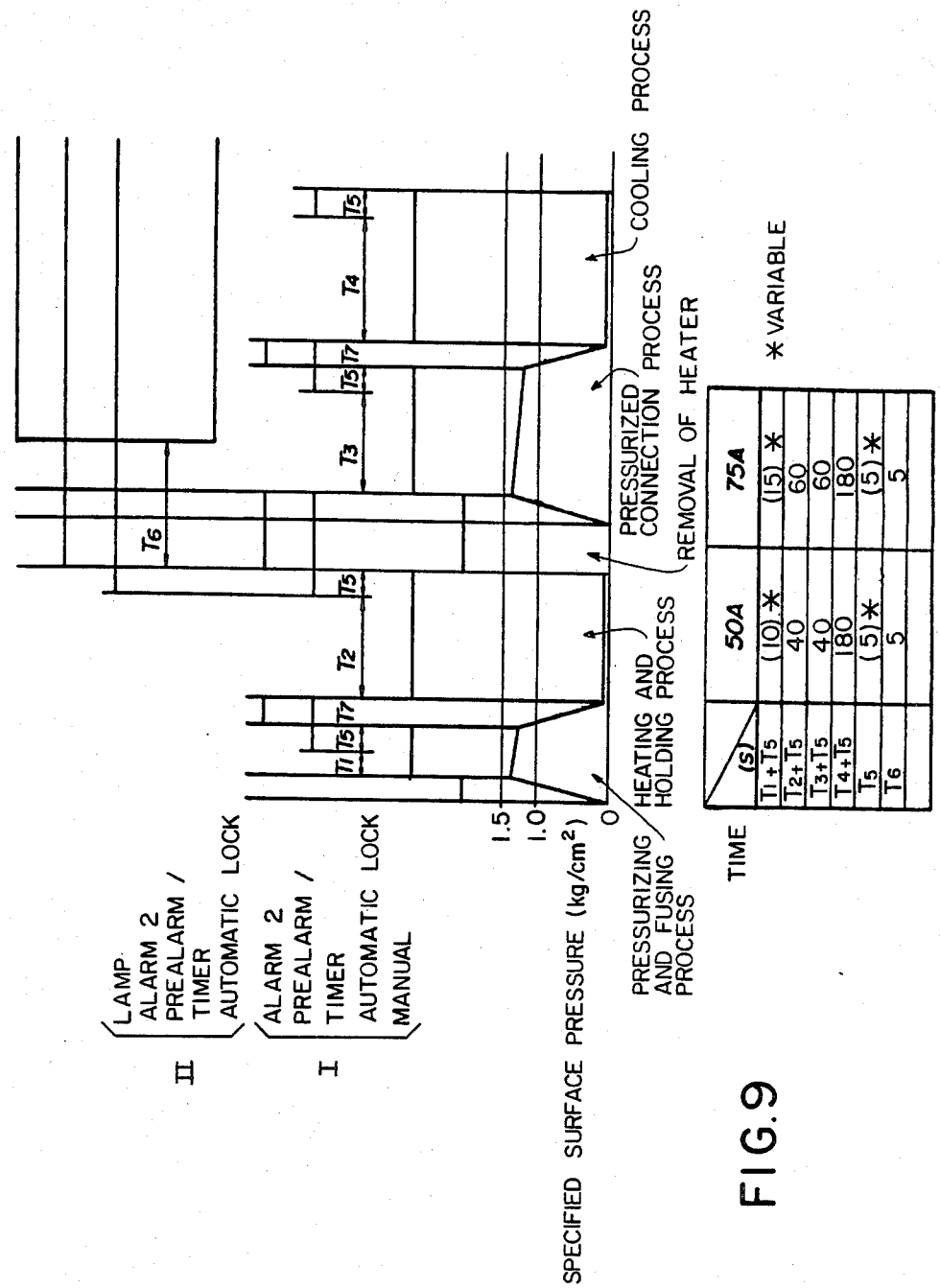
FIG. 9 is a time diagram illustrating a typical program used in the apparatus.

A mechanical, electrical or electronic timer is programmed to keep the solenoid 74 in an energized condition for predetermined time periods, the durations of which are shown in the table of FIG. 9. During these time periods, the pawl tooth 82 remains engaged with the rod 72 to hold the torque wrench 11 and clamp mechanism 3 in position. At the conclusion of each of these time periods, the timer deenergizes the solenoid to unlock the torque wrench and clamp mechanism.

The buffer mechanism 50 is, for example, configured as shown in FIG. 5. Oil fills the space between the hydraulic cylinder 51 and piston 71 and this oil flows into a tank 54 through a small hole 53 to provide a buffering effect. A stopper 55 fitted with an O-ring 56 closes off the bottom part of the cylinder 51. The inner end of the stopper is movable to positions where it partially obstructs the small hole 53, thereby permitting adjustments in the return of piston 71 by increasing or decreasing the axial position of this stopper.

Figure 6:
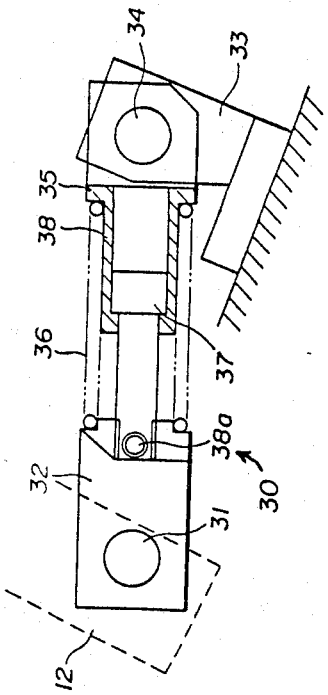
FIG. 6 is an enlarged front view of an embodiment of the compensating mechanism.

As shown in FIG. 6, the compensating mechanism 30 consists of a spring support 32 which is pivotally secured to the link 12 by a pin 31. A spring seat 35 is pivotally connected by a pin 34 to a bracket 33 which is fixed to the base 1. A helical compression spring 36 is inserted between the spring support 32 and spring seat 35. A guide portion 37 is fixed by a pin 38a to the spring support 32 and is guided by a cylindrical portion 38 of the spring seat 35. The spring support 32 is biased away from the spring seat 35 by the coil spring 36.

In the present invention, each process for making a fusible connection is programmed because the optimum pressurizing force, fusing time, pressurized connection time and other conditions will vary in accordance with the pipe diameter. A suitable program is automatically selected when the clamp liner $L_2$ is inserted or removed to change the diameter of the clamp mechanisms. As shown in FIG. 7 and FIG. 8, the program selecting mechanism 110 includes an operation cam 112 which is fixed to the liner $L_2$ by screws 111, and a limit switch 113 operated by the cam 112. The limit switch 113 is operated through a link mechanism when the operation cam 112 presses a roller 114. However, when the liner $L_2$ is removed, the limit switch 113 does not operate, and a program is automatically selected through ON-OFF of a contact 115 of the limit switch 113. The reference number 117 in FIG. 8 designates a protective cover for the limit switch 113.

Now, the procedures of fusingly connecting polyethylene pipes using the disclosed apparatus will be explained. The pipe ends are inserted into the split rings 4a and 4b. Then, the external threads 7 are tightened. The liners $L_1$ and $L_2$ are replaced as necessary to correspond to the different pipe diameters. Thereby, the pipes $P_1$ and $P_2$ can be held in an accurate position. Here, it is obvious that programs can be selected automatically by removing the liner $L_2$.

Then, the fusible surfaces of the pipes are chamfered by the cutter 22. The torque wrench 11 is rotated in the direction indicated by the arrow B in FIG. 1. Thereafter, the pipes are fusibly connected semi-automatically in accordance with the operation program shown in FIG. 9. When a pipe having a nominal diameter of 50A is considered, the torque wrench 11 is rotated until the surfaces to be connected are pressed against the heater until the applied pressure reaches about 1.3 kg/cm². At this time, operation of the torque wrench has caused the rack 91 to rotate the pinion 92 so that the variable resistor 93 generates an electrical signal which actuates the solenoid 74 of the lock mechanism. This locks the torque wrench holder 14. In this condition, the pressurizing and fusing process is carried out for about 10 seconds including the prealarm time $T_5$. However, since the lock mechanism 70 is operating in this condition, the next step of the process cannot start.

When the prealarm and alarm operate for an adequate time (respectively $T_5 + T_7$) and the determined pressurizing and fusing time passes, the lock mechanism 70 is released. Spring force returns the torque wrench to its initial position. At this time, the buffer mechanism 50 operates, absorbing any impact and vibration caused by the return motion of the torque wrench. When the torque wrench returns almost to the zero position, as detected by the positions of the rack 91 and pinion 92, the lock mechanism 70 is automatically engaged and the heating and holding process starts. During this portion of the process, the pipe ends are held in contact with the heater, at little or no pressure for about 40 seconds including the prealarm time.

After the heating and holding process has been performed for the determined time, the alarm operates and the lock mechanism 70 is released. At this time, the torque wrench 11 is manually operated to retract the movable clamp 3 so that the heater may quickly be removed. Then, the torque wrench is rotated again in the direction of arrow B to apply a pressurized connecting force to the connecting surfaces of the pipes $P_1$ and $P_2$. When this pressurized connecting force reaches about 1.3 kq/cm², an electrical signal from the signal generating mechanism 90 actuates the lock mechanism 70 to lock the torque wrench holder 14 in position. This pressurizing process continues for about 40 seconds. The prealarm operates at the determined time before the end of the pressurizing process. When the prealarm terminates its operation, the alarm operates and the lock mechanism 70 is released. When the torque wrench returns to the zero torque position, the lock mechanism reengages to hold the torque wrench at this position during the cooling process for about 180 seconds. When the cooling process terminates, the lock is automatically released.

Even if the ends of the pipes move into each other so that the clamps move toward each other when pressure is being applied, the pressure will be maintained by the compensating mechanism 30. Usually, the fusing connection is executed in accordance with the mode designated I in FIG. 9, but if a longer time is taken to remove the heater, the prealarm and the alarm continue the operation shown in II, and the lock mechanism 70 remains in the locked condition. The successive sequence of operations is interrupted and the fusing connection must be restarted from the beginning.

When the liner $L_2$ is removed in order to change the liner from a pipe size 50A to a pipe size 75A, the microswitch 113 does not operate and a program is also changed so that the pipes of 75A will be fusingly connected according to the program shown in the table of FIG. 9.

As explained above, each process for connecting polyethylene pipes is programmed. Therefore, only the pressurizing operation of the torque wrench and removal of the heater are performed manually. Other operations are executed automatically. This provides an excellent solution to the disadvantages of existing methods. The present invention has been intended primarily for fusingly interconnecting the ends of polyethylene pipes, but of course it can also be used to connect main piping and branched pipings if modified clamp saddles are used.

Figure 10:
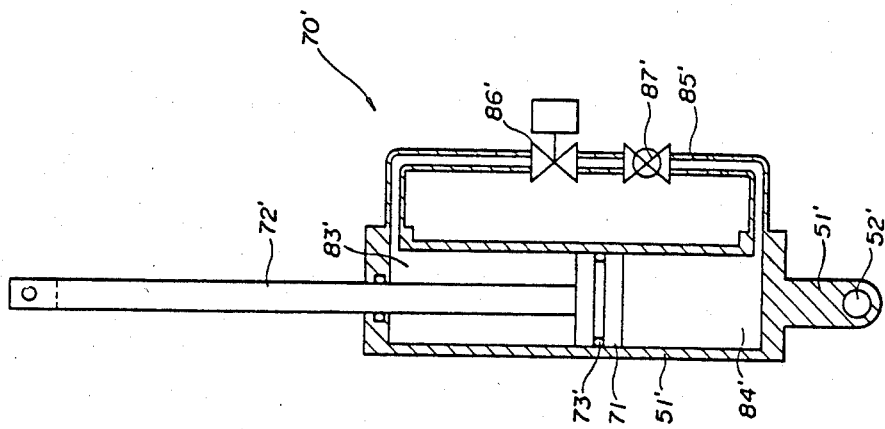
FIG. 10 is a schematic diagram of an alternative embodiment of the lock mechanism.

While this invention has been particularly shown and described with reference to a preferred embodiment thereof, it will be understood that numerous changes in form and details may be made without departing from the spirit and scope of the invention. For example, the electric signal generating mechanism may be constructed so that the rack is mounted on the indicating needle, while the pinion is mounted on the torque wrench body. In addition, it is possible to generate an electric signal by operating a microswitch in response to the displacement of the torque wrench. The lock mechanism can also be formed as shown in FIG. 10 wherein primed numerals have been used to designate modified elements which correspond to those shown in FIG. 5. In FIG. 10, the piston head chamber 84' and the rod chamber 83' of the hydraulic cylinder 51' are connected through a bypass pipe 85', a solenoid valve 86', and an adjusting valve 87'. When the solenoid valve 86' closes, flow of oil in the cylinder is cut off to prevent any movement of the piston rod 72', thereby acting as a lock mechanism. This valve 86', when it opens, also acts as a buffer to absorb the impact generated when the torque wrench recovers.

Figure 11:
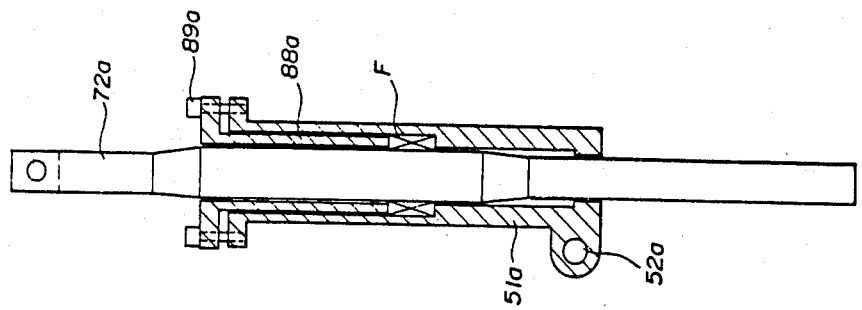
FIG. 11 is a schematic diagram of another embodiment of the buffer mechanism.

The buffer mechanism can also be changed to a mechanical system in place of the hydraulic system. For example, as shown in FIG. 11, a felt F is inserted between the cylinder 51a and the rod 72a. Friction forces between the felt and rod are operable to absorb impact in this mechanism. In this case, the buffering capability can be changed by means of the adjusting bolts 89a to adjust the extent of insertion of the felt stopper 88a.

Persons familiar with the field of the invention will recognize that the invention may take many forms in addition to the embodiments disclosed in this specification. Accordingly, it is emphasized that the invention is not limited to the disclosed embodiments but is embracing of such other forms which fall within the spirit of the following claims.

We claim:

1. Apparatus for fusibly interconnecting two pipes with a butt joint, comprising
   a pair of clamp mechanisms for holding two pipes, one of said clamp mechanisms being supported for movement in an axial direction to permit the movement of one pipe toward the other pipe, manually operated lever means operatively connected to one said clamp mechanism for moving said one clamp mechanism toward the other clamp mechanism, means for providing a signal when the force applied by the lever to said one clamp mechanism is a preset value, locking means operable in response to said signal to lock said lever in position, heating means for engaging the ends of said pipes which are urged thereagainst by operation of the lever means, said locking means being operable to hold the pipes against said heating means, timer means operable to unlock the lever after a preset period of time during which the ends of the pipes are fused, said lever means being operable to move the fused ends of the pipes together to form a butt joint, said locking means being operable to hold the fused ends of the pipes together to form a butt joint therebetween, said timer means being operable to unlock the lever at the end of a preset period of time during which the butt joint has cooled, compensating means for maintaining a force on the movable clamp mechanism to compensate for relative movement which occurs between the clamp mechanisms when the lever is locked, and buffer means for absorbing impact and vibration resulting from the unlocking of the locking means.

2. Apparatus according to claim 1 wherein the lever means is a torque wrench which includes a movable needle, and the means for providing a signal is operable to provide an electrical signal in response to movement of the needle to a preset position.

3. Apparatus according to claim 1 wherein the lever means is a torque wrench which includes a body portion and a needle portion which is movable relative to the body portion in response to the application of force to the torque wrench, said means for providing a signal being operable to provide an electrical signal in response to movement of said needle portion relative to said body portion.

4. Apparatus according to claim 3 wherein the means for providing a signal includes a variable resistor on one said portion.

5. Apparatus according to claim 4 including a pinion connected to said variable resistor, and a rack on the other said portion, said rack being engaged with said pinion in order to move said variable resistor in response to relative movement between said portions.

6. Apparatus according to claim 1 wherein said clamp mechanisms are changeable in size to receive pipes of different sizes, and means for changing a said preset period of time in response to changes in the size of one of said clamp mechanisms.

7. Apparatus according to claim 1 including a program selecting means which determines a said preset period of time applied by the apparatus when fusibly connecting two pipes.

8. Apparatus according to claim 7, wherein the program selecting means is operable to change a said preset period of time in response to changes in the diameter of one of the clamp mechanisms.

9. Apparatus for fusibly interconnecting two pipes, comprising a pair of clamp mechanisms for holding two pipes, one of said clamp mechanisms being supported for movement in an axial direction to permit the movement of one pipe toward the other pipe, torque wrench means operatively connected to one said clamp mechanism for moving said one clamp mechanism toward the other clamp mechanism, said torque wrench means including a needle which is movable in response to the force applied by the torque wrench, means for providing a signal in response to movement of the needle to a position which indicates that the force applied by the torque wrench to said one clamp mechanism is a preset value, locking means operable in response to said signal to lock said torque wrench in position, said locking means being operable to unlock said torque wrench at the end of a predetermined time period, and means for changing the predetermined time period in response to changes in the diameter of one of the clamp mechanisms.

10. Apparatus for fusibly interconnecting two pipes with a butt joint, comprising a pair of clamp mechanisms for holding two pipes, one of said clamp mechanisms being supported for movement in an axial direction to permit the movement of one pipe toward the other pipe, manually operated lever means operatively connected to one said clamp mechanism for moving said one clamp mechanism toward the other clamp mechanism, means for providing a signal when the force applied by the lever to said one clamp mechanism is a preset value, locking means operable in response to said signal to lock said lever in position, compensating means for maintaining a force on the movable clamp mechanism to compensate for relative movement which occurs between the clamp mechanisms when the lever is locked, heating means for engaging the ends of said pipes which are urged thereagainst by operation of the lever means, said locking means being operable to hold the pipes against said heating means, timer means operable to unlock the lever after a predetermined period of time during which the ends of the pipe are fused, means for automatically relocking the lever means at substantially zero pressure so that the heater in this relocked condition will further heat the ends of said pipes for an additional predetermined period of time, said timer means being operable to unlock the lever means at the end of said additional predetermined period of time to permit the pipe ends to move apart and the heating means to be removed from the area between the pipe ends, said lever means being operable to move the fused ends of the pipes together to form a butt joint, said locking means being operable to hold the fused ends of the pipes together to form a butt joint therebetween, said timer means being operable to unlock the lever at the end of a predetermined period of time during which the fused ends of the pipes are connected together by a pressurized connection, means for automatically relocking the lever means at substantially zero pressure and holding the connected pipes after the butt joint has cooled, and buffer means for absorbing impact and vibration resulting from the unlocking of the locking means.

* * * * *